(12) United States Patent
Oursler et al.

(10) Patent No.: US 6,980,093 B2
(45) Date of Patent: Dec. 27, 2005

(54) COMMERCIAL VEHICLE ELECTRONIC SCREENING HARDWARE/SOFTWARE SYSTEM WITH PRIMARY AND SECONDARY SENSOR SETS

(75) Inventors: Mark A. Oursler, Severna Park, MD (US); Wendy W. Chiu, Columbia, MD (US); Gary C. Worrell, Columbia, MD (US); John H. Fewer, Jr., Elkridge, MD (US); Ronald K. Char, West Friendship, MD (US)

(73) Assignee: The Johns Hopkins University, Baltimore, MD (US)

( * ) Notice: Subject to any disclaimer, the term of this patent is extended or adjusted under 35 U.S.C. 154(b) by 179 days.

(21) Appl. No.: 10/430,869

(22) Filed: May 7, 2003

(65) Prior Publication Data

US 2004/0021579 A1 Feb. 5, 2004

Related U.S. Application Data

(60) Provisional application No. 60/378,375, filed on May 7, 2002.

(51) Int. Cl.⁷ ................................................ B60Q 1/00
(52) U.S. Cl. ................... 340/425.5; 340/572; 340/5.8; 340/907; 705/13; 235/384
(58) Field of Search ............................... 340/928, 907, 340/932.2, 933–943, 572, 5.8; 705/13; 701/1; 235/384–5, 235/491

(56) References Cited

U.S. PATENT DOCUMENTS

| | | | |
|---|---|---|---|
| 4,325,146 A * | 4/1982 | Lennington | 398/108 |
| 4,465,151 A | 8/1984 | Gorman et al. | |
| 4,969,112 A | 11/1990 | Castle | |
| 5,422,473 A * | 6/1995 | Kamata | 235/384 |
| 5,717,595 A | 2/1998 | Cherrington et al. | |
| 5,737,710 A * | 4/1998 | Anthonyson | 701/1 |
| 5,815,071 A | 9/1998 | Doyle | |
| 6,108,591 A | 8/2000 | Segal et al. | |
| 6,111,524 A * | 8/2000 | Lesesky et al. | 340/942 |
| 6,167,333 A | 12/2000 | Gehlot | |
| 6,191,705 B1 | 2/2001 | Oomen et al. | |
| 6,278,921 B1 | 8/2001 | Harrison et al. | |
| 6,317,668 B1 | 11/2001 | Thibault | |
| 6,374,240 B1 * | 4/2002 | Walker et al. | 707/5 |
| 6,388,579 B1 | 5/2002 | Adcox et al. | |

(Continued)

OTHER PUBLICATIONS

CVISN Guide to Electronic Screening, POR-99-7193, Draft Version D.1, Oct. 1999.*

(Continued)

*Primary Examiner*—Daniel Wu
*Assistant Examiner*—Travis Hunnings
(74) *Attorney, Agent, or Firm*—Albert J. Fasulo, II

(57) ABSTRACT

A primary set of sensors is situated along a highway approaching a weighing/inspection station, and a secondary set of sensors is situated along a ramp that is traversed by vehicles exiting the highway into a weighing/inspection station. The secondary sensors use vehicle identification based upon transponders and/or alternate means (such as license plate readers) that are suitable for lower speeds and for vehicles not equipped with transponders. The sensors are coupled to a processing system that accesses a database storing data correlated to vehicles using the highway. Upon the sensing of certain parameters by the primary sensors, the vehicles are directed to exit the highway to the weigh station entry ramp. The secondary set of sensors along the ramp provide an ability to identify transponder and non-transponder equipped vehicles and more accurate sensing capability due, among other things, to the slower speed of the vehicle while passing sensors.

1 Claim, 4 Drawing Sheets

U.S. PATENT DOCUMENTS

| | | |
|---|---|---|
| 6,421,590 B2 | 7/2002 | Thibault |
| 6,427,101 B1 | 7/2002 | Diaz et al. |
| 6,429,773 B1 | 8/2002 | Schuyler |
| 6,430,486 B1 | 8/2002 | Diaz et al. |
| 6,459,050 B1 | 10/2002 | Muhs et al. |
| 6,459,367 B1 | 10/2002 | Green et al. |
| 6,477,452 B2 | 11/2002 | Good |
| 6,744,352 B2 * | 6/2004 | Lesesky et al. ............. 340/431 |
| 2001/0003436 A1 | 6/2001 | Yoshikawa |
| 2001/0010028 A1 | 7/2001 | Thibault |
| 2002/0016655 A1 | 2/2002 | Joao |
| 2002/0019689 A1 | 2/2002 | Harrison et al. |
| 2002/0042670 A1 | 4/2002 | Diaz et al. |
| 2002/0049523 A1 | 4/2002 | Diaz et al. |
| 2002/0059075 A1 | 5/2002 | Schick et al. |
| 2002/0065698 A1 | 5/2002 | Schick et al. |
| 2002/0097178 A1 | 7/2002 | Thomas, Jr. et al. |
| 2002/0111725 A1 | 8/2002 | Burge |
| 2002/0133275 A1 | 9/2002 | Thibault |
| 2002/0150050 A1 | 10/2002 | Nathanson |
| 2002/0169529 A1 | 11/2002 | Kim |
| 2002/0173887 A1 | 11/2002 | Flick |

OTHER PUBLICATIONS

CVISN Overview Washington State Dept. of Transportation Pub. Jun. 25, 2003, http://cvisn.wsdot.wa.gov.

How Do Truck Weigh Stations Work, How Stuff Works Pub. Apr. 28, 2003, http://science.howstuffworks.com.

What is PrePass? PrePass Information Pub. Apr. 22, 2003, http://www.prepass.com.

CVISN Guide to Electronic Screening Johns Hopkins Apl Edu. Pub. Oct. 1999, POR-99-7193 Draft Version, www.jhuapl.edu.

Introductory Guide to CVISN Johns Hopkins Apl Edu Pub. May 1999, POR-99-7186 Prel. Version P. 1, www.jhuapl.edu.

* cited by examiner

COMMERCIAL VEHICLE ELECTRONIC SCREENING HARDWARE/SOFTWARE SYSTEM WITH PRIMARY AND SECONDARY SENSOR SETS

CROSS-REFERENCE TO RELATED APPLICATIONS

This application claims the benefit of U.S. provisional application No. 60/378,375, filed on May 7, 2002, which is hereby incorporated by reference in its entirety.

STATEMENT OF GOVERNMENTAL INTEREST

This invention was made with Government support under Contract No. DTFH61-99-C-00051 awarded by the Department of Transportation. The Government has certain rights in the invention.

BACKGROUND OF THE INVENTION

Field of the Invention

This invention relates to electronic screening of transponder-bearing units and, more particularly, to the electronic screening of vehicles using a road or highway system.

Highways and roads are the backbone of the transportation system of most developed or developing countries. While other modes of transportation, such as aircraft, trains, and marine vessels may be used, highways and roads are generally pervasive and available to all citizens for use.

As a result of the large network of highways and the locations that are reachable using them, trucking is one of the most often-used modes of transportation for shipping goods, materials for goods, etc., and thus trucks contribute significantly to the wear-and-tear on the roads and, by virtue of their sheer numbers, are frequently involved in accidents while using the roads. Trucks are typically quite large (i.e., in excess of 80,000 lbs.) and thus can be dangerous if improperly handled or operated in an unsafe condition; in addition, their great weight can cause rapid deterioration of pavement and other road surfaces.

To protect citizens, both physically and fiscally, the Federal government and most states regulate the trucking industry to ensure that the vehicles operating on their roads are in good working order. Further, most states collect taxes from trucking companies and truck owners based on the weight of the truck and of the goods transported by truck, so that trucks contributing to the deterioration of the road (and the resulting need for maintenance) pay their fair share of the costs of repairing and maintaining the roads.

To be able to properly regulate the trucking industry, weight/inspection stations are utilized on most highways. Signs direct trucks to pull into the stations to have their weight checked to ensure that the trucks are in compliance with federal and state weight regulations. These stations use static scales, which require that the truck pull onto the scale and stop while being weighed.

While the vehicle is slowing and stopped on the scale, law-enforcement personnel can inspect and check it for proper credential decals and other obvious safety problems. If any problems are observed, the driver is asked to pull into an inspection area at the site for a more thorough examination. Law enforcement personnel typically may direct a small random sample of vehicles to pull into the inspection area for a more thorough examination, even without observing obvious safety problems. This serves as a check on vehicles that otherwise look to be in compliance with the laws and regulations, and gives the drivers and truck owners an incentive to keep their vehicles maintained in compliance with the laws and regulations to avoid being caught out of compliance.

The weighing process alone can result in delays of 30 seconds to five minutes or more. The inspection process can increase this time to in excess of 30 minutes. These delays can represent a significant cost to trucking operations, particularly in situations where "just-in-time" shipping is being utilized and delays can result in reduced revenues. At some high traffic stations, the queue can back up onto the highway, forcing temporary closure of the station to avoid a safety hazard. Periods when the station is closed provide no enforcement for the trucks that are bypassing the station.

To improve the process, "electronic screening" systems ("e-screening") have been developed. Electronic screening is the application of technology to make more informed screening decisions. Properly implemented, electronic screening results in improved traffic flow, focuses the vehicle inspections, and ultimately achieves the goals of increased safety and reduce operating costs.

An example of a prior art electronic screening system is "PrePass" (www.prepass.com). PrePass is a system that allows participating transponder-equipped commercial vehicles to bypass designated weigh stations and other such facilities. A vehicle participating in the PrePass system is identified in a database proprietary to the PrePass system, as part of the pre-certification process conducted when the vehicle is registered in the system. The database contains weight information and "credential information" regarding the vehicle and correlates this information with a PrePass transponder ID number that corresponds to a transponder carried in the vehicle.

As a vehicle approaches a PrePass-equipped weight/inspection station, it comes into the range of an Automatic Vehicle Identification (AVI) antenna, which communicates with the transponder to identify the transponder ID number, thereby giving the PrePass system access to the saved data for that vehicle. At the same time, the vehicle passes over a WIM scale, and the weight data obtained from the scale is also transmitted back to the PrePass system. This allows the PrePass system to verify that the vehicle should be able to bypass the inspection station. Assuming everything is verified, a signal is sent to the transponder causing it to issue an audible signal and "go" indication (e.g., a "green light") directing the driver to pass the station without needing to stop.

An e-screening system concept that complies with the architecture of the "CVISN" architecture prescribed by the Federal Motor Carrier Safety Administration is described in "Introductory Guide to CVISN", §2.7 The CVISN e-screening concept has many advantages because of its use of a standardized national database that is shared among the states with data and methods of exchange that are standardized according to CVISN architecture. While having many advantages when compared to PrePass, both of these suffer from some disadvantages. Mainline screening alone, based upon AVI, is largely ineffective because it cannot reach the vast majority of trucks that do not operate with a transponder. Mainline screening systems must send all the vehicles that do not have transponders into the weigh station. At many stations, queuing backups would not be alleviated until at least 30–50% of the mainline vehicles were bypassed. Currently, on the order of 1–2% of commercial vehicles carry transponders, so e-screening systems designed around mainline screening alone cannot be effective. Additionally, mainline (i.e., highway-based) WIM scales are inherently inaccurate because the trucks are operating at highway speeds when being weighed using the mainline WIM scale. Vehicle dynamics generated by bumps in the highway road surface and the path of the vehicle contribute to inaccuracies when using mainline WIM scales. As a result, even the transponder-equipped vehicles tend to be directed into the weigh/inspection station to be subjected to the more rigorous and time-consuming static weighing system and detailed inspection process, only to be found in compliance and redirected back to the highway after significant (and unnecessary) delay.

It is desirable to have an e-screening system that can conduct a secondary screening process, based upon AVI and alternative vehicle-identification technology after an initial (primary) screening process to reduce the number of vehicles that are subjected to the time-consuming static-scale weighing process improperly due to the inaccuracies inherent in mainline WIM scale measurements.

SUMMARY OF THE INVENTION

This invention is a system and method for screening screenable items such as vehicles navigating a highway system. In accordance with the present invention, a primary set of sensors is situated along a highway approaching a weighing/inspection station, and a secondary set of sensors is situated along a ramp that is traversed by vehicles exiting the highway into the weighing/inspection station. The primary sensors use vehicle identification based upon transponders that is suitable for highway speed, while the secondary sensors use vehicle identification based upon transponders and/or alternate means (such as license plate readers) that are suitable for lower speeds and for vehicles not equipped with transponders. The primary sensors and secondary sensors are coupled to a processing system that enables access to a database storing a multiplicity of data correlated to vehicles using the highway system, and which is configured to enable an operator working in the weighing/inspection station to set one or more screening parameters related to the vehicles. Upon the sensing of certain parameters by the primary sensors, the vehicles are directed to exit the highway to the weigh station entry ramp. The secondary set of sensors along the ramp provide an ability to identify transponder and non-transponder equipped vehicles and more accurate sensing capability due, among other things, to the slower speed of the vehicle while passing sensors. As a result, non-transponder-equipped vehicles and transponder equipped vehicles that are improperly directed into the weighing/inspection station due to inaccurate readings from the primary sensors are likely to be identified and redirected back to the highway instead of being subjected to the lengthy and more rigorous static weighing process and detailed inspection procedure.

DESCRIPTION OF THE PREFERRED EMBODIMENT(S)

Figure 1:
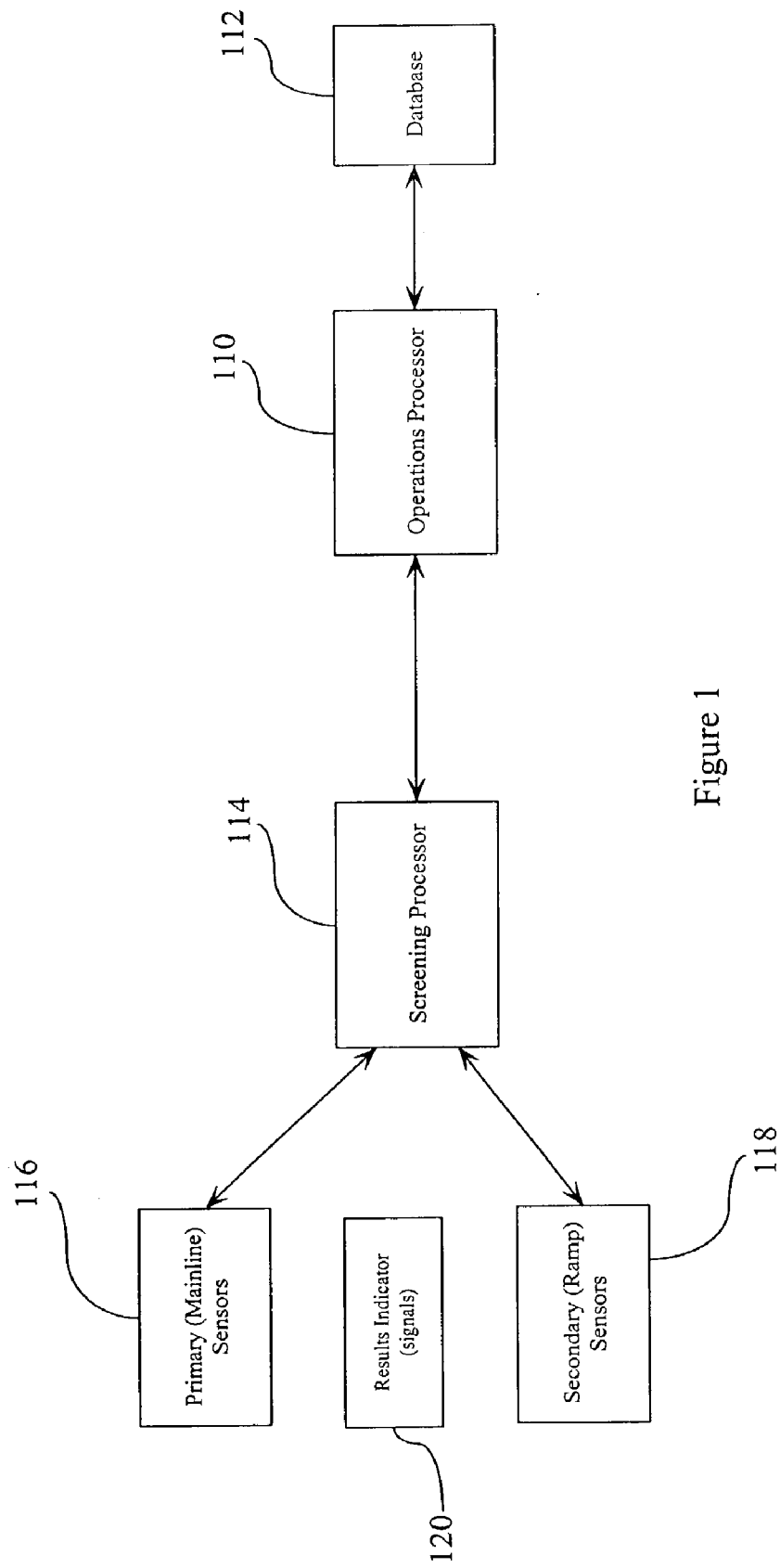
FIG. 1 is a block diagram illustrating the basic elements of the present invention.
Figure 2:
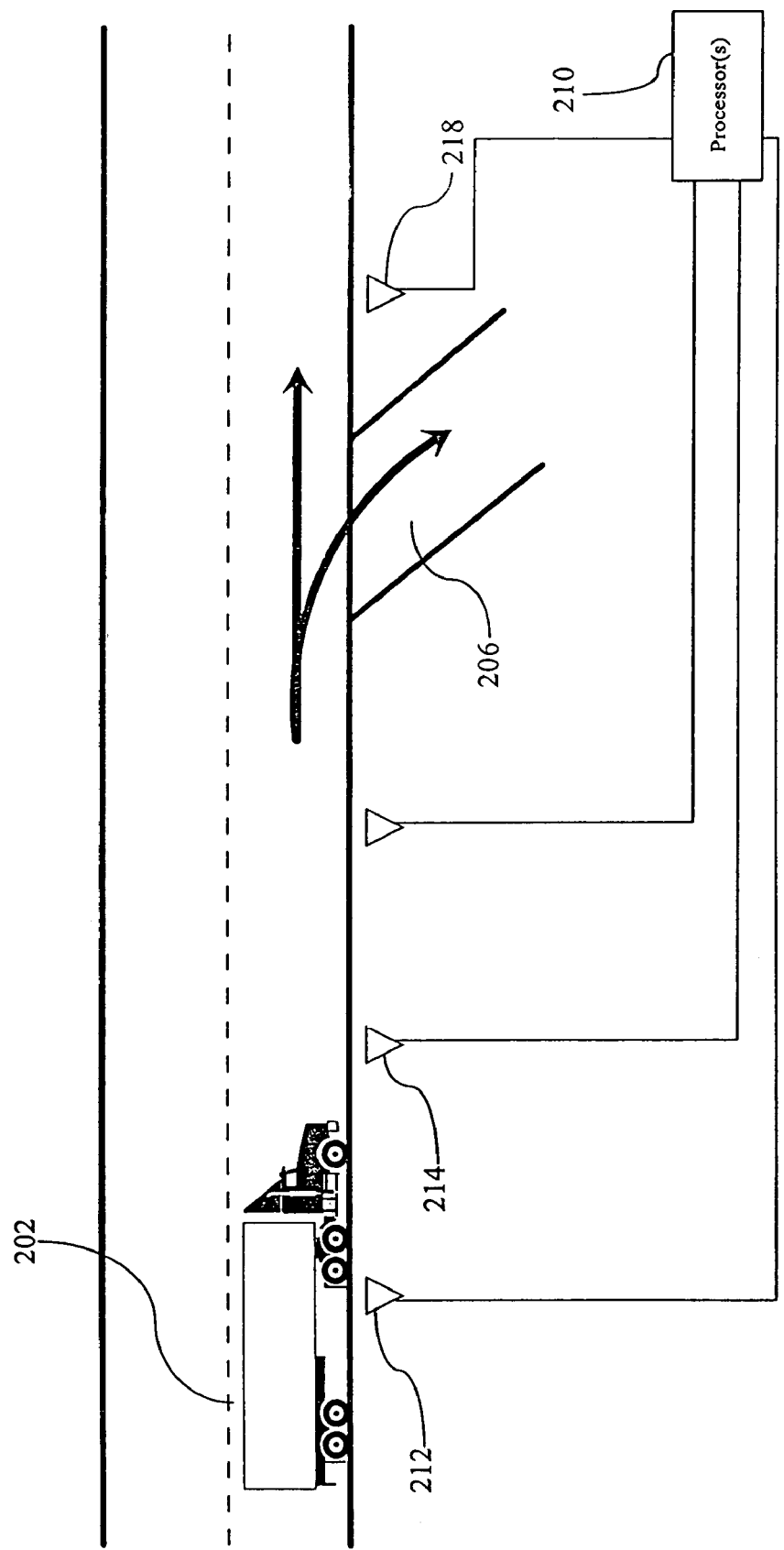
FIG. 2 illustrates mainline screening performed in connection with the primary sensors.

FIG. 1 is a block diagram illustrating the basic elements of the present invention. It is understood that the block diagram of FIG. 1 shows the functional elements of the present invention and it is understood that the functions may be performed by a larger or smaller number of elements than the number shown in FIG. 1 and still fall within the spirit and scope of the present invention.

Referring to FIG. 1, an operations processor 110 is coupled to a database 112. Database 112 stores data pertaining to vehicles that may be using the system of the present invention. It is understood that database 112 can be a specialized database storing only data relating to vehicles registered to use the system of the present invention, a general database storing data regarding data pertaining to all vehicles operating within a particular state, nation, etc., or multiple databases storing such information. In a preferred embodiment, database 112 comprises databases operated and maintained by the Federal Motor Carrier Safety Administration in connection with its CVISN (Commercial Vehicle Information Systems and Networks) program.

Operations processor 110 is also coupled to screening processor 114, which in turn is coupled to primary sensors 116 and secondary sensors 118. In a preferred embodiment, operations processor 110 is a Roadside Operations Computer (ROC) and screening processor 114 comprises a screening computer, the operations of which are more fully described below.

In accordance with the present invention, primary sensors 116 are utilized to obtain sensor readings for a first level of screening to be performed by the system 100. If the preliminary screening performed by primary sensors 116 indicate a "pass" or other similar condition indicating that no further screening is needed, this information is conveyed via results indicator 120 and is also passed back to the operations processor 110 for storage. If, on the other hand, the preliminary screening performed by primary sensors 116 indicates a "fail" or other similar condition indicating the need for further investigation and/or screening, this information is also conveyed via results indicator 120 and is passed back to the operations processor 110 for storage.

The "fail" indication directs the item being inspected/monitored to move to a second level of screening performed by secondary sensors 118. Secondary sensors can comprise sensors that take the same readings as those taken by the primary sensors and also add means to identify vehicles that would not have been identified by the primary sensors. The secondary sensors can take readings, but at a higher level of resolution and/or accuracy, or they can take a different set of readings that will be more accurate than the primary sensors in inspecting/monitoring the item under test. Similar to the process described above with respect to the primary sensors, the secondary screening process performed by the secondary sensors will have either a "pass" result or a "fail" result; if a "pass" result occurs, the item under test is moved along without further testing and the results are recorded and stored, and if a "fail" result occurs, the item is moved to a high resolution testing area where more resolute and careful inspecting/monitoring takes place.

The general operation of the system of FIG. 1 is described below in connection with the inspection and weight-monitoring of commercial trucks operating on a particular section of a highway where and inspection/weigh station is located. It is understood that while this example represents the preferred embodiment of the invention, it is given for purpose of example only and the claimed invention is not limited to this type of inspection/monitoring.

The primary sensors in this example are referred to as "mainline sensors" because they are located along the highway itself, the main line of travel for all vehicles operating on the highway. The mainline sensors can comprise an AVI sensor for reading data from a transponder located in the cab of a truck subject to weighing and inspection. Vehicles wishing to take greatest advantage of the screening system of the present invention must be enrolled or registered with the system so that their transponder identification can be correlated to the data appropriate to the vehicle in which the transponder is located. In addition, WIM sensors operating in conjunction with a WIM scale situated in the road surface leading up to the inspection station may be included as part of the primary sensors. Overheight detection sensors may also be part of the primary sensors. Any sensors capable of gathering information from a vehicle moving at highway speed can be included as part of the primary sensors 116.

In this example, operation processor 110 functions autonomously based upon inputs provided by the weigh station operator familiar with the weighing and inspection of vehicles. Operation processor 110 is configured, in a well known manner, with a Graphical User Interface (GUI) that enables the operator to input screening parameters to be used by the screening processor 114 when performing the weighing and inspection process. The operator of the operations processor 110 inputs screening parameters to the screening processor 114 in a known manner, for example, via manual input or selection from a drop-down menu in the GUI. Multiple screening parameters may be input, and these parameters set the thresholds for whether or not a particular vehicle will be given a "pass" or "fail" indication. In this example, a "pass" indication will instruct the truck to bypass the weigh/inspection station, i.e., continue along the highway at normal speed, while a "fail" indication will instruct the truck to pull off onto the ramp of the weigh/inspection station for the secondary level of screening.

As the vehicle 202 approaches the AVI sensor 212, the AVI sensor reads the transponder ID and sends the transponder ID information to the screening processor. The transponder ID is forwarded to the operations processor, where the transponder ID is used to identify the vehicle associated with that particular transponder ID from the registration information. For example, using the transponder ID, the operations processor can query the database 112 for (and download) the latest data pertaining to this vehicle. This information can include the name of the carrier, the VIN of the truck, the registered weight of the vehicle, status of any violations, information pertaining to payment or nonpayment of taxes, or any other information contained in the database. This information is conveyed to the screening processor, and if any of the information from the database indicates that a screening threshold has been met, then a "fail" indication (e.g., a "pull in to station" instruction) is sent to the vehicle. In a preferred embodiment, this indication is transmitted to the transponder in the vehicle, triggering a light indicator (e.g., red for "pull in to station" and green for "bypass station") to be displayed in the cab. Other indication means can be utilized, including audible tones, radio transmissions, visual signals, and the like.

If desired, the system can be configured with a sensor (AVI) along the mainline just past the ramp to the weigh/inspection station, to monitor compliance with the notifications given. Thus, for example, AVI 218 will sense each transponder-equipped vehicle passing the ramp 206, and the screening processor 114 will check its identity as previously described with respect to AVI 212, and perform a look-up operation to determine if the sensed vehicle has been cleared to bypass the weigh/inspection station. If the look-up indicates that the vehicle had not been cleared, this can be noted and stored in the operations processor 110, and the database 112 can be updated with this violation information. Further, if desired, the system can be configured to notify law/regulation enforcement authorities so that the vehicle can, if appropriate, be intercepted and pulled over further down the highway by the authorities.

Figure 3:
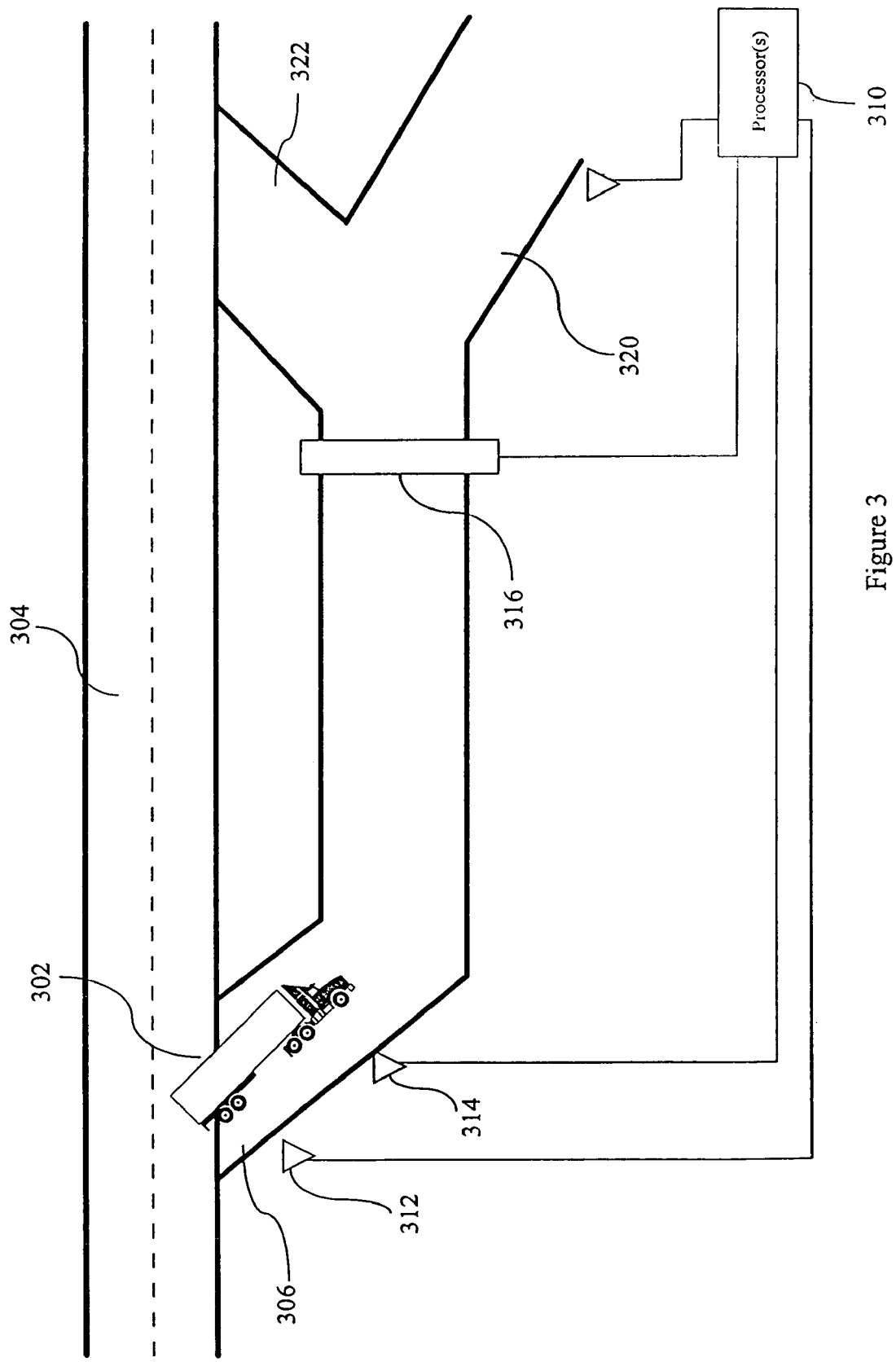
FIG. 3 illustrates ramp screening performed in connection with the secondary sensors.

FIG. 3 illustrates the ramp screening performed in connection with the secondary sensors 118. As shown in FIG. 3, the secondary sensors 118 can include AVI and alternate vehicle identification sensors, sensors 312, WIM sensor 314, and/or any sensor capable of sensing parameters from a moving vehicle (e.g., height sensors, tag readers and the like). As the vehicle 302 passes AVI sensor 312, the identity of the vehicle is identified as discussed above with respect to AVI sensor 212 or by any other alternate means that can identify a vehicle that is not transponder equipped. At step 314, the WIM sensor weighs the vehicle a second time. WIM sensor 314 will obtain better readings than the WIM sensor 212 located on the mainline because the vehicle 302 is traveling at a significantly slower speed, thereby increasing the accuracy of the sensed weight. In addition, the ramp itself provides an approach to the WIM that is smooth and flat and is subject to frequent maintenance and therefore presents a surface that minimizes errors due to vehicle dynamics. Similar more accurate results are obtained from other sensors such as height sensors, and the like.

Using this the second level of sensors, vehicles that, using prior art systems, would have been subject to the slower, more thorough static scales and/or more thorough manual inspection process may instead be found, at the secondary screening level, to be in compliance. When this occurs, a signal 316 directs the vehicle 302 back to the mainline 304 via inspection station exit ramp 322. This significantly reduces traffic in the station, delays on the highway and in the station, and results in more efficient use of the inspectors' time. Stations that would otherwise have to cycle open and closed as their static scale queues back up onto the highway can now remain open ensuring that all commercial vehicles are uniformly subjected to the screening process.

If the results of the secondary screening process indicate the need for further inspection and/or weighing, signal 316 will display directions to vehicle 302 directing the vehicle to pull off to static scale 320, where the more thorough inspection and weighing can occur. In accordance with another aspect of the present invention, the static scales 320 is configured to record the weight measurement taken by the static scale 320 and store this weight measurement in processor 310. The weight measurements of WIM scale 214 and WIM scale 314 are similarly stored in processor 310. The static scale weights are considered to be accurate within regulations governing the requirements of weight enforcement. This enables the accuracy of WIM scale 214 and WIM scale 314 to be automatically monitored. Processor 210 can be configured so that automatic correction of minor errors in the WIM measurements can be made. If there is a significant discrepancy between the weight measured by the WIM scales and the weight measured by the static scale, processor 210 provides maintenance personnel with an immediate indication that corrective measures can be taken. This provides the system with an ongoing check on the accuracy of the system overall and ensures that all vehicles entitled to bypass the static scales are provided that benefit.

Figure 4:
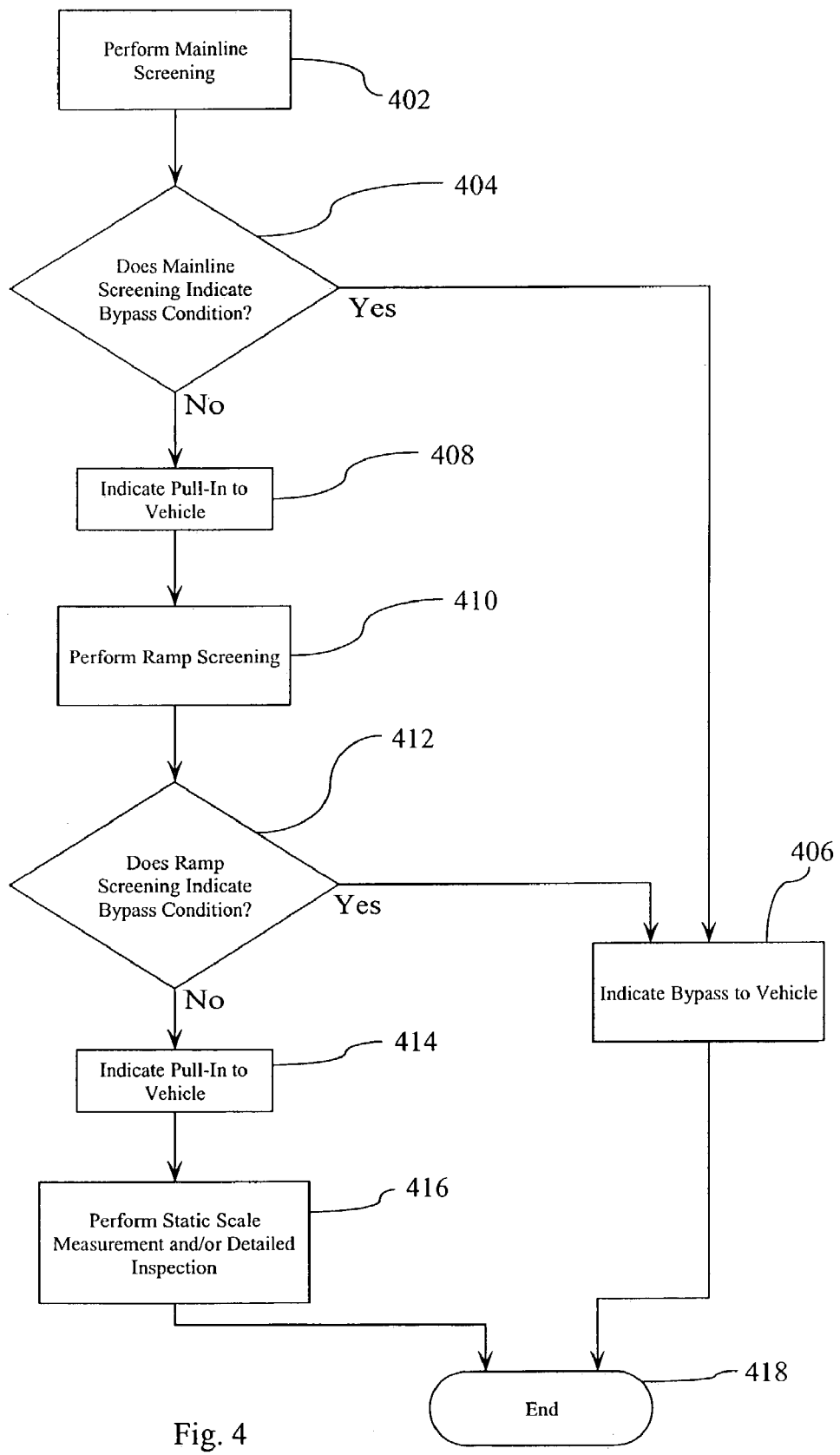
FIG. 4 is a flowchart illustrating an example of steps performed in accordance with the method of the present invention.

FIG. 4 is a flowchart illustrating an example of steps performed in accordance with the method of the present invention. At step 402, the mainline screening is performed. Next, at step 404, a determination is made as to whether or not the mainline screening indicates a bypass condition as described above. If, at step 404, a determination is made that a bypass condition does exist, the process proceeds to step 406, wearing indication is given to the vehicle directing it to bypass the inspection station. The process then terminates at step 418.

If, at step 404, it is determined that the mainline screening does not indicate a bypass condition, the process proceeds to step 408, or the vehicle is given indication to pull onto the ramp of the inspection station. As the vehicle enters the ramp 306, at step 410 it is subjected to the ramp screening (secondary screening) process as described above. At step 412, a determination is made as to whether or not the array of screening process indicates a bypass condition. If, at step 412, the screening process indicates a bypass condition, then the process proceeds to step 406 where a bypass indication is given to the vehicle. This directs the vehicle to proceed back to the highway. The process then terminates a step 418.

If, at step 412, the ramp screening process does not indicate a bypass condition, at step 414 in indication is given to the vehicle to pull in to the static scale area, and at step 416 the static scale measurement and/or detailed inspection is commenced. The results of this inspection and/or weighing process are stored in the system and the process terminates at step 418.

The method and system of the present invention offers many advantages over the prior art. By using two-level screening, a far greater number of vehicles can be screened so that queuing back-ups at the static scales can be eliminated, the number of "false positives" will be reduced, since the inaccuracies of using a highway WIM scale are overcome by the use of a second WIM scale as the vehicle operates at a slower speed. Further, by recording the weights measured by the static scale and comparing them with the weights measured by the WIM scales, inaccuracies in the WIM scales can be detected and eliminated almost immediately, before they are used to inaccurately measure a large number of vehicles.

EXAMPLE

The following is an example illustration of the operation of a hypothetical system installed along Route 95 in Maryland, in accordance with the present invention. In this example, the following acronyms are used:

WIM: Weigh-in-Motion, as in a weigh-in-motion scale;
AVI: Automatic Vehicle Identification;
CVISN: Commercial Vehicle Information Systems and Networks;
CVIEW: CVISN compliant database maintained by the state of Maryland;
ROC: Roadside Operations Computer;
GUI: Graphical User Interface;
ICN: In-Cab Notification.

A Roadside Operations Computer, or ROC, is installed in conjunction with the E-screening system, typically at the location of weight station. The ROC receives safety and credentials data from an external database that is operated by the host state. It is the interface by which states share these types of data within the CVISN architecture. The ROC serves as the station operator's Graphical User Interface (GUI) to the E-screening system. This allows the operators to set various screening criteria. The ROC calculates pull-in rates for vehicles, based on the safety and credentials data and exchanges data with the E-screening system.

Automatic Vehicle Identification

The E-screening System utilizes the capability to automatically identify approaching vehicles on the highway in advance of the Weigh/Inspection station, on the highway adjacent to the station, and at various points within the station. Several technologies exist to accomplish this goal. In one embodiment, AVI is used to refer to a radio frequency two-way communications link between a roadside reader with antenna over the road and a transponder installed on the vehicle. Each transponder has an identification number that is uniquely associated with the vehicle and all of the safety and credentials database information for that vehicle. The transponder is also able to receive the screening decision from the roadside and display it to the driver as a red or green light illuminated on the transponder. This is referred to as In-Cab Notification (ICN).

Although AVI allows realization of the full benefits of E-screening, the E-screening system is designed to accommodate vehicles that do not have transponders or are otherwise unidentifiable. The unavailability of database information for these unidentifiable vehicles does limit the information on which the screening decisions for these vehicles must be made.

The E-screening system design is adaptable to other vehicle identification technologies that may not offer two-way communications (e.g., license plate readers). These systems use alternate means of advising the drivers of the screening decision rather than ICN, such as electronic signals or signs situated at roadside.

Electronic Screening Overview

There are five major components of the process of E-screening in this example:
1. Transponder validation,
2. Weight & Size Screening,
3. Safety screening, based on the carrier and vehicle safety history,
4. Credentials screening, based on specific credential violations or history information, and
5. A random selection factor to randomly pull in a selected percentage of vehicles Selection for pull-in will be made even if only one component denies bypass, regardless of the other conditions. In order to retrieve the appropriate data for screening, some form of carrier and vehicle identification is required; this comes from the AVI system in the preferred embodiment.

There are three data sources involved in the process of retrieving information used in electronic screening in this example:
1. The transponder on board the commercial vehicle, used to identify the carrier and vehicle,
2. The ROC, which contains a database based on snapshot data from CVIEW, the state's central server, and
3. The E-screening computer, containing specific screening criteria that are passed to it from the ROC.

These processes are further described in the following sections.

Transponder Validation

The E-screening system of this Example will recognize all compatible vehicle transponders; however, the data that reside on these transponders remains the proprietary information of the agency that issues the transponder. The vehicle cannot be E-screened unless it has been enrolled in the E-screening program for the jurisdiction that operates the E-screening system, either directly or by reciprocity agreement with the issuing agency. If the transponder is recognized but does not appear in the database of enrolled transponders, it is considered to be an unrecognized transponder and the vehicle will be treated as if it has no transponder, for the purposes of E-screening.

Weight and Height Screening

Weight and height screening is based on the weight estimates from the WIM sensors and on over-height detectors on the ramp and mainline. There are several elements to this method of weight and height screening:

A over-weight threshold set to some percent of the legal weight,

An overheight threshold set to the maximum legal height plus a small buffer, and WIM error conditions may void the WIM reading.

Safety Screening

Safety screening in this example is based on carrier safety and inspection history data derived from the CVISN compliant state maintained database. The goals of safety screening are to:

focus inspection resources on those carriers and vehicles that are most likely to be in violation, and provide a benefit to those carriers that have good safety histories.

To meet these goals, the selection process is weighted to pull in mostly unsatisfactory or unidentified vehicles, while stopping only a small portion of the transponder-equipped vehicles not otherwise flagged by the screening process. The continued occasional sampling of all transponder-equipped vehicles provides the incentive to maintain a good safety rating. The E-screening operator can set the safety screening criteria.

Credential Screening

Credential screening looks for vehicles that have very specific inspection or review needs. The following elements are used in the credential-screening process in this example:

Missing or invalid credentials

IFTA check status for Carrier

IRP or Trip Permit status for Vehicle

Manual selection for specific Carrier or Vehicle

The E-screening operator sets the credential screening criteria.

Random Selection Component

The random selection component serves several purposes, including random viewing for visual inspection selection, expanded data collection, and compliance monitoring. Even the best-rated operators should be occasionally examined to verify their continued compliance. A random element is included in the safety screening method described above. In addition, it is essential for the E-screening operator to have control over the overall screening rates for conditions in which the site cannot handle the resulting traffic. A "control valve" can be applied, referred to as the "maximum random sort rate." This value can be applied to adjust the pull-in rate for all vehicles by an equal amount. The operators must use their experience to set the sort rates such that balanced flow is achieved through the station.

The actual pull-in rate for any individual vehicle is the product of the screening pull-in rate and the maximum random sort rate. Any other clear reason for pull-in, such as a possible weight violation detected by WIM will take precedence. The E-screening operator sets the maximum random sort rate parameters.

E-Screening Functional Subsystems

The e-screening system of this example can be divided into the following three functional subsystems:

Roadside Operations Computer (ROC) Version 4 and software

Mainline Screening components and software

Ramp Screening components and software

Keeping the ramp and mainline screening subsystems functionally separate permits flexibility in the adaptation of this design to specific e-screening deployments. Physically, the software modules can reside on the same or on separate computers. E-screening systems can incorporate either ramp or mainline screening, or both, based on site-specific requirements.

Roadside Operations Computer (ROC)

The ROC is the primary operator interface to the E-Screening system (maintenance and trouble-shooting functions require access to the screening or subsystem computers). The ROC performs the following functions:

Set carrier and vehicle screening criteria for safety and credentials information contained in the snapshots Receive carrier and vehicle snapshots, individually or by subscription from the state maintained CVISN compliant database (also known as the State CVIEW)

Display carrier or vehicle snapshot data

Display screening event data, such as WIM weight and classification data, carrier and vehicle identification if identified by AVI, and pull-in or bypass status and reasons.

Remote Procedure Calls With the ROC

The software technology used in transferring information between the screening computer and the ROC is called the Remote Procedure Call (RPC). RPC is an interprocess communication technique to allow client and server software to communicate. With RPC, essential program logic and related procedure code can exist on different computers, which is important for distributed applications such as the system of this example.

In the case of the ROC, when a user uses the ROC Graphical User Interface (GUI) to set the screening criteria and send the resulting screening values to the mainline or the ramp screening computer, the ROC is acting as a client, and the screening computer is acting as the server. As the screening computer screens vehicles, the screening computer sends the vehicle information back to the ROC, in which case the ROC becomes the server, and screening computer becomes a client.

Before data can be passed between the clients and the servers, the clients and the servers must agree on the remote procedure's calling sequences—basically, the names and the arguments that are passed and returned. This agreement is written in the form of an interface definition file using the interface definition language (IDL). The main use of an interface definition is to declare each remote procedure offered by the server. Each procedure declaration specifies the name of the procedure, the order and data types of any parameters, and the data type of any return value. Each interface definition must also be unique so that clients can distinguish interfaces from one another. The interface definition file header that includes a Universal Unique Identifier (UUID) and version number provides uniqueness.

Screening Computer

The screening computer is the computer that gathers and processes all the information coming from the different sensors installed in the roadway or over the roadway via electronics located on the roadside. This includes WIMs, AVIs, tracking loops, over-height detectors, an automatic vehicle classifier, static scales, the operator panel, and the station signs and signals. When a truck equipped with a transponder comes along on the highway, its transponder will send the identifier information to the screening computer via the AVI. When the truck goes over the WIM, the WIM will send the weight information to the screening computer. With the transponder ID, the screening computer can look up the screening values sent from the ROC earlier, and together with the weight information and other data such as the over-height status, the screening computer can decide a "pull-in" or "by-pass" and send that decision to the AVI overhead signals. In addition, the screening computer can also send an in-cab notification signal to the transponder to notify the driver to pull-in or by-pass. Finally, the screening computer sends the screening results to the ROC database for storage.

Screening Criteria

In this example, the operator goes to the Screening Criteria panel in the ROC GUI to set the screening criteria. The Screening Criteria panel allows users to set the screening criteria and sends the screening values to the screening computer, where they are stored as tables for use in the screening process. The screening criteria for the mainline and the ramp are set separately to allow the E-screening operator the flexibility necessary to balance flow through the station.

For credentials violations, the screening pull-in rate is set to 101% to represent "must pull in." Manual selections of carriers and vehicles for the hot list are also available to signal a carrier or vehicle to pull in regardless of its other credentials and safety ratings. These carriers and vehicles will also have pull-in rates of 101%. Otherwise, the screening pull-in rate will be based on the safety history of the carrier or vehicle, and will range from 10% for those with the best histories to 100% for those with the worst histories and for unidentified vehicles.

The Maximum Pull-In Rate is a value between 0% and 100% that multiplies the pull-in rate, so it represents the maximum rate at which a vehicle with a 10% screening pull-in rate will be pulled in either to the ramp in the case of mainline screening or the static scales in the case of ramp screening. Screening values are updated any time the screening criteria are changed or when new snapshots are received from the state CVIEW.

Screening Computer Database

In this example, there are three sets of screening values that are sent from the ROC to the screening computer each time the screening criteria are changed on the ROC. There is one set for all the carriers that are enrolled in Maryland E-screening, another set for all the vehicles that are enrolled in Maryland E-screening, and a third set that includes all the enrolled transponders given to the various carriers that can operate in Maryland.

Screening Computer Database

For the carrier table, the carrier name is also sent along with its carrier ID and the screening value. This is done so that the screening computer can send the carrier name back to the ROC whenever the corresponding carrier ID is detected from a transponder and the ROC can immediately display the carrier name on the ROC Vehicle Display.

In compliance with Maryland law, the example E-screening System uses registered weight as the vehicle's legal weight, rather than the maximum allowable weight based on the vehicle classification. Registered weights are sent to the screening computer for both the vehicle and the tag tables so that the screening computer can compare the weights measured by the WIMs.

The WIM threshold is an additional parameter that must be passed from the ROC to the screening computer. It is the weight threshold at which the vehicle is determined to be closer to the legal limit than the uncertainty in the WIM weight due to the sensor's limited accuracy.

The screening computer is responsible for sending roadside vehicle information to the ROC to be displayed to the E-screening operator in the scale house. This computer runs distinct mainline vehicle screening and ramp vehicle screening processes.

Mainline Vehicle Screening

Once the screening values are calculated at the ROC and sent to the screening computer, the screening computer must process them and make screening decisions. These screening values are stored into three separate tables, discussed below.

One of the most difficult tasks implemented in the screening processes is the merging of the various data collected from various sensors over a time interval into a single vehicle record. For example, due to variations in vehicle length, vehicle speed, vehicle classification, and transponders, the time lag between the receipt of the WIM records from the WIM computer and the transponder ID from the AVI can vary. A tunable correlation process properly associates these data to the vehicle record for all commercial vehicle types.

The Screening Computer processes inputs from the Advance Pre-screening AVI, the mainline WIM and over-height detector. It makes a "pull-in" or "bypass" decision and sends the decision to the Notification AVI. When the mainline compliance system Automatic Vehicle Classifier detects a truck that is bypassing the station, the screening computer does a look up to confirm that the detected vehicle has been cleared.

The functions of the mainline screening process are summarized below:

Receive and process screening data tables from the ROC
Make safety/credential screening decision
Receive and process screening input parameters from the ROC (such as WIM threshold, maximum pull-in rate)
Correlate mainline WIM and AVI records
Check weight and height compliance
Make bypass/pull-in decision
Detect non-compliant vehicles
Send mainline vehicle information to the ROC
Provide limited diagnostic and health status Ramp Vehicle Screening In this example, all commercial vehicles not cleared by the mainline screening system are required to exit the highway and proceed onto the Weigh/Inspection Station ramp. Ramp vehicle screening is very similar to the mainline vehicle screening except that it must accommodate vehicles without transponders. The differences are as follows:

The Ramp screening system attains more accurate WIM measurements by virtue of the lower vehicle speeds and less suspension dynamics over a flatter road surface.
Instead of using the in-cab notification, the ramp screening uses an overhead signal to inform the vehicle drivers to proceed to the static scales (pull-in) or return to the highway (bypass).
The ramp uses tracking loops to accurately track vehicles since it cannot use AVI.

After weight and height screening, vehicles are instructed by the overhead signals whether to continue back to the mainline (bypass), or whether to proceed to the static scales (pull-in).

The functions of the ramp screening process are summarized below:

Receive and process screening data tables from the ROC
Make safety/credential screening decision
Receive and process screening input parameters from the ROC (such as WIM threshold, maximum pull-in rate)

Correlate ramp WIM and AVI records
Check weight and height compliance
Make bypass/pull-in decision
Detect non-compliant vehicles
Send ramp vehicle information to the ROC
Provide limited diagnostic and health status
Correlate static scale and AVI records
Send static scale information to the ROC This list is very similar to the list for Mainline Screening, except that two additional functions with the static scale have been added to the bottom of the list. These support WIM accuracy monitoring as discussed below.

WIM Accuracy

WIM derived weight measurements are inherently less accurate than static scale measurements and both WIMs and static scales require periodic calibration to maintain maximum accuracy. The static scales are routinely calibrated to maintain the high accuracy necessary for their legal use for enforcement. The E-screening System supports WIM accuracy assessment by storing the WIM and static scale weight measurements for each transponder-equipped vehicle. Employing AVI on the mainline, ramp, and at the static scales is crucial to enabling this correlation. Whenever the system records a WIM or static scale weight record that it correlates with a transponder ID, it sends these data to the ROC to be saved.

Software can be used to extract WIM and static scale weight records that were recorded on the same pass of a particular vehicle through the system and these can be compared to establish a measure of the WIM accuracy.

The accuracy assessment can be as simple as a semi-manual process whereby the system simply provides the accuracy information to maintenance personnel who then make the decision to recalibrate the WIM at periodic intervals based on this information. The process can be as complex as a fully automatic calibration algorithm in which WIM calibration factors are dynamically updated based on a continuous error assessment.

The following is a description of the example system layout:

Mainline Advance Pre-Screening Subsystem in the right southbound mainline lane one mile upstream of the station entry. This subsystem includes AVI, WIM, and overheight detection.

Notification Subsystem in the right southbound mainline lane ½ mile upstream of the station entry. This subsystem includes AVI set up to do. In Cab Notification (ICN).

Mainline Compliance Subsystem in all three southbound mainline lanes adjacent to the entry ramp to the station. This subsystem includes Automated Vehicle Classifiers (AVCs) in each lane and AVI in the right and center lanes. Trucks are restricted to these two lanes when bypassing the station.

Ramp Screening Subsystem in the right ramp lane in the station. This includes AVI and a tracking loop at the ramp entry, WIM in the right ramp lane, overheight detection, computer controlled overhead sign for directing ramp traffic, and compliance tracking loops in the return lane to the highway and the lane to the static scales.

Static Scale Subsystem. This includes AVI over each of two static scale lanes and static scales connected to supply weight data into the E-Screening system.

Scale House Subsystem includes the Roadside Operations Computer, screening computer, and interfaces to the station Programmable Logic Controller and operator console.

This example E-Screening system uses four AVI readers, a mainline WIM, mainline AVC, and a ramp WIM. The four AVIs in this configuration are the Advance Pre-screening reader, Notification reader, Compliance/Ramp Entry reader, and Static Scale reader.

Mainline Advance Pre-Screening Subsystem

In the example layout, commercial vehicles must be in the right lane in order to pass through the Advance Pre-screening AVI read zone and over the WIM sensors. A tracking loop that is part of the WIM subsystem is also used as the mainline entry loop. Its purpose is to reliably detect the crossing of a vehicle and time-stamp the vehicle record, which is the collection of all the information about the vehicle gathered by the different sensors. The Screening Computer in the Scale House System is responsible for processing information from the various sensors and merging them into individual vehicle records. If the vehicle carries a compatible transponder, the AVI will pick up the transponder ID number and the Screening Computer will save it into the corresponding vehicle record. The mainline WIM provides vehicle weight estimates as input to the mainline screening algorithm. Gross vehicle weight along with axle weights and spacing are also merged into the vehicle record. Although not as accurate as the static scale, the weight estimates are sufficient to identify vehicles that are traveling below registered weight. The WIM data are used as a component of the screening decision.

If the vehicle weight exceeds a weight threshold, the mainline screening algorithm will mark the vehicle as overweight. If the vehicle is taller than the legal limit, the overheight detector will set a flag in the WIM message. Both the overweight and the overheight violation statuses are recorded in the vehicle's vehicle record. An auxiliary camera is also installed to monitor traffic flow approaching the Mainline Advance Pre-Screening System.

The Advance Pre-Screening AVI reader's function is to identify all vehicles enrolled in the E-Screening program. If no transponder exists or the transponder is not enrolled in the E-Screening program, then the vehicle will be treated as an unidentified vehicle, which must exit onto the station ramp. If the vehicle does have an enrolled transponder, the Advance reader delivers a screening message, including the carrier and vehicle identifiers, and sends this information to the Screening Computer for use in determining whether to clear the vehicle or direct the vehicle's driver to pull into the station. All vehicles in the right lane will be weighed and classified by the mainline WIM subsystem regardless of whether they can be identified specifically.

Notification Subsystem

The Notification AVI is located far enough downstream of the Advance AVI so that the mainline screening algorithm has time to complete all necessary processing as the vehicle approaches. Since a transponder-equipped vehicle could be signaled to pull in or bypass, the Notification reader is located far enough from the station ramp entry so that the vehicle's driver will be able to react without endangering other vehicles on the roadway.

In Cab Notification (ICN) is used to notify vehicles with enrolled transponders to either exit onto the station ramp, or to proceed on the mainline, depending on the results of the screening process. Vehicles equipped with an enrolled tag will receive visual and audio signals informing the driver of the screening decision. This is accomplished by a command sent to the vehicle transponder from the Notification AVI reader. This command sets the audio and visual indicators on the transponder. The driver should bypass only on receipt of green signal and audio tone. If a red signal and audio tone is received, then the driver must pull in unless roadside signs specifically show the station is closed. If no signal is received, the driver should obey the station roadside signs. These guidelines should handle situations where the station is closed, the tag fails to receive the message, or equipment malfunctions.

Mainline Compliance Subsystem

By the time a vehicle enrolled in the E-Screening program has passed the Notification AVI reader, it has been electronically screened. However, it is also necessary to verify that vehicles are not illegally bypassing the inspection station. Therefore, a Compliance AVI reader and an AVC system are located on the mainline, past the entrance ramp to the station. The AVC classifies all vehicles that bypass the station and specifically identifies all commercial vehicles. The AVC works in conjunction with the Compliance AVI. The AVI checks vehicles with transponders to verify that the vehicle was cleared to bypass the station. When the station is open, only commercial vehicles that have been directed to bypass the station by the ICN signal should pass through the Mainline Compliance Subsystem. If a violation is detected, an indication is given to enforcement personnel.

The E-Screening system accommodates the unique site configuration that may result in vehicles entering the system downstream of the Notification Subsystem; but, upstream of the Ramp Entry.

Ramp Screening Subsystem

All vehicles not cleared on the mainline are required to pull onto a single lane exit ramp. The exit ramp branches later into two lanes. Vehicles entering the inspection station ramp fall into one of the following categories:

1. Transponder equipped and enrolled, valid legal weight: The vehicle has been identified, a valid weight has been recorded, and the screening algorithm has determined to bring the vehicle into the station for closer review. This may be based on specifically identified problems, or may be due to random selection. Closer review may be limited to a visual check while on the static scale, or may include an inspection based on the visual review, on data reported back in the screening process, or on random selection.

2. Transponder equipped and enrolled, invalid or over weight: The vehicle has been identified; however, either the WIM failed to properly register the weight or the detected weight exceeded the criteria.

3. Transponder equipped, unrecognized: The vehicle is equipped with a transponder; however, it may either be unrecognized due to technical problem or not enrolled in MD—the vehicle is treated as if it has no transponder and will not see any lights on its transponder by ICN.

4. Transponder equipped, bypassed Advance Pre-Screening: The vehicle either was not in the correct lane when it passed the Advance site or it has entered the highway downstream of the—the vehicle is treated as if it has no transponder and will not be signaled by ICN.

5. No Transponder: The vehicle must enter the inspection station.

Upon entering the station ramp, vehicles with enrolled transponders are identified by the Ramp entry AVI and all vehicles are assigned a sequential number. All vehicles are weighed and classified by the ramp WIM. A screening decision is made and the overhead message sign subsequently directs the vehicle. Cleared vehicles are signaled to return to the mainline. Vehicles receiving a pull-in decision on the ramp are directed to the static scale. The ramp screening system is specifically intended to focus on vehicles in categories 2, 3, and 4 above. The Ramp WIM may be able to provide a more accurate weight estimate than the Mainline WIM due to lower speed and a flatter road surface. This may enable vehicles that were in category 2 to be cleared based on weight and safety screening. Ramp screening may also pick up vehicles that are equipped with enrolled transponders that were for some reason not recognized on the mainline (category 3) or who just entered the highway or otherwise bypassed the mainline screening (category 4). These vehicles can be cleared by the ramp screening system.

All ramp vehicles will be directed by overhead lane signals to either proceed to the static scale or return to I-95, depending on the screening results.

All vehicles are expected to follow the lane signals. ICN is not used within the station to avoid conflicting signals between the ICN and the lane signals.

Static Scale Subsystem

The Static Scale AVI is used to identify enrolled transponder equipped vehicles that are on either of the static scales. Safety and credential data for the vehicle are available to the static scale operator to support visual inspection of the vehicle. Static scale weights for enrolled vehicles are extracted and merged into the vehicle record. For all enrolled transponder equipped vehicles, the saved weights for the vehicle from the mainline and ramp WIM's and the static scale support WIM accuracy and trend studies.

Scale House Subsystem

The Screening Computer runs a mainline screening process that processes all the information received from the different subsystems pertaining to a single vehicle into a vehicle record and sends it to the ROC for storage and display. The Screening Computer also runs an analogous ramp screening process and merges the processed information into vehicle records and sends them to the ROC. The Screening Computer also interfaces to the weigh station's Programmable Logic Controller (PLC). Inputs from tracking loops, operator manual override and outputs to overhead signs all pass through the PLC.

Local Area Network Data Communications

The E-screening system of this example design uses a fiberoptic local area network (LAN, supporting a 100 Mbps Ethernet running TCP/IP protocol), which enables all data communications between sensor subsystems and the screening computer and ROC to be handled over one pair of multimode fibers. The communications backbone fiberoptic cable is "daisy chained" from the Scale House to each sequential roadside subsystem using Ethernet switches. Commercial Off-The Shelf (COTS) components are used to support the data communications LAN; however, software processes described above that are a part of this disclosure are required on the screening computer in order to enable these devices to work properly.

Communication Servers

The interfaces between sensors and host electronics in the roadside cabinets are by copper cable. Typical data outputs from vendor-supplied electronics are RS232 serial data. Within each cabinet, a Communication Server converts these serial data to Ethernet messages while software hosted on the screening computer packages these data into TCP/IP data packets that can be used by the screening software processes.

Other Serial Data

The only place that serial data are not converted and put onto the LAN is the scale house static scale interface. The static scales output a continuous serial data stream that must be sampled relatively infrequently. Here, the serial data are provided directly to the screening computer.

Ethernet Switches

The Communication Server output in each cabinet is 10 Mbps Ethernet on copper wire. This is connected to a 10/100 Mbps Ethernet switch that converts it to 100 Mbps on multimode fiber. One or two such switches (depending on location) are resident in each cabinet in order to provide the necessary number of fiberoptic input and output connections. These switches are also required to connect the four fiberoptic LAN segments. Separation between switches must remain within the specified limits for the switches to function. For this example system design, the maximum spacing between Ethernet switches is the 3300 feet between the Advance Pre-Screening and Notifications sites. This is well within the 2000-meter specification for the selected components.

Remote Power Switches

Resident in each cabinet is a remote power switch that is connected to the LAN. Each of the components that may require a remote reboot are plugged into this power switch and reboot can be initiated from the screening computer in the scale house. Ethernet switches are powered directly from the Uninterruptible Power Supplies (UPS) since an inadvertent loss of power to the switches would bring the network down and would not allow further control of the power switch.

Programmable Logic Controller

The existing station PLC is incorporated into the E-Screening system in this example with the addition of an Ethernet interface module that directly interfaces it to the E-Screening LAN. This provides direct access to any of the PLC controlled or monitored signs or switches. Software was developed to interface with this module.

The various steps performed by the above-described system steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a workstation located at the weigh station. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, FIGS. 1–4 support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A system for electronically screening vehicles traveling on a road having an exit ramp along which is situated a vehicle weigh station, the vehicle weigh station having a static scale configured to make static weight measurements of said vehicles, comprising:

a first weigh-in-motion (WIM) scale, positioned along the road in the proximity of said vehicle weigh station, configured to make a first weight measurement of said vehicles;

a second WIM scale, positioned along the exit ramp and associated with said weigh station, configured to make a second weight measurement of said vehicles;

one or more indicator signals, positioned near the first and second WIM scales so as to be perceivable by drivers of said vehicles, which, when activated, direct said traveling vehicles to either pull onto or bypass the exit ramp and/or the static scale;

a processor, coupled to said first and second WIM scales, said static scales and said one or more indicator signals, configured to (i) correct said first and second WIM weight measurements based on said static weight measurements; and (ii) activate said one or more indicator signals based on said corrected first and second weight measurments.

* * * * *